US009189949B2

(12) United States Patent
De Luca et al.

(10) Patent No.: US 9,189,949 B2
(45) Date of Patent: Nov. 17, 2015

(54) AUTOMATED MONITORING AND CONTROL OF CONTAMINATION IN A PRODUCTION AREA

(75) Inventors: Nicholas De Luca, Washington, DC (US); Koichi Sato, Saratoga, CA (US)

(73) Assignee: Sealed Air Corporation (US), Duncan, SC (US)

( * ) Notice: Subject to any disclaimer, the term of this patent is extended or adjusted under 35 U.S.C. 154(b) by 554 days.

(21) Appl. No.: 12/928,362

(22) Filed: Dec. 9, 2010

(65) Prior Publication Data

US 2012/0146792 A1 Jun. 14, 2012

(51) Int. Cl.

| G08B 13/14 | (2006.01) |
|---|---|
| G08B 23/00 | (2006.01) |
| G08B 21/00 | (2006.01) |
| G08B 21/24 | (2006.01) |
| G08B 21/22 | (2006.01) |
| G08B 21/12 | (2006.01) |
| G06Q 10/08 | (2012.01) |

(Continued)

(52) U.S. Cl.
CPC .......... *G08B 21/245* (2013.01); *G06K 9/00771* (2013.01); *G06Q 10/08* (2013.01); *G08B 3/10* (2013.01); *G08B 13/1427* (2013.01); *G08B 21/12* (2013.01); *G08B 21/22* (2013.01)

(58) Field of Classification Search
CPC ...... G08B 13/1427; G08B 3/10; G08B 21/22; G08B 21/12; G08B 21/24; H04Q 9/02; G06K 9/00281; G06Q 10/08
USPC .................. 340/568.1, 10.1, 500, 540, 573.1, 340/686.1, 686.2, 686.6; 382/103, 115, 382/100, 182, 286, 291; 348/143, 77, 94
See application file for complete search history.

(56) References Cited

U.S. PATENT DOCUMENTS 5,023,597 A 6/1991 Salisbury
5,164,707 A * 11/1992 Rasmussen et al. .......... 340/551

(Continued)

FOREIGN PATENT DOCUMENTS

EP 1 939 811 A1 7/2008
KR 100 789 721 B1 2/2007

(Continued)

OTHER PUBLICATIONS

Hydra: Multiple People detection and Tracking Using Silhouettes, Haritaoglu et al, Computer Vision Laboratory, University of MD, 6 pages (1999).

(Continued)

*Primary Examiner* — Hoi Lau
(74) *Attorney, Agent, or Firm* — Schwabe, Williamson & Wyatt

(57) ABSTRACT

In an automated process for monitoring and controlling contamination in a production area, captured image data is processed to determine whether an individual is to wearing an article of contamination control equipment (e.g., gloves, face mask, etc) and whether the equipment is properly positioned on the individual. A determination that the contamination control equipment is not present or not properly positioned automatically activates a contamination control device such as contamination control means (e.g., shutting off power to machine) or an alarm or generates and sends a report of the contamination control protocol violation. An automated system for monitoring and controlling contamination includes a computer, an imaging sensor in communication with the computer, and a computer-readable program code disposed on the computer.

15 Claims, 10 Drawing Sheets

(51) Int. Cl.
*G08B 3/10* (2006.01)
*G06K 9/00* (2006.01)

(56) References Cited

U.S. PATENT DOCUMENTS

| | | | |
|---|---|---|---|
| 5,305,390 A | | 4/1994 | Frey et al. |
| 5,465,115 A | | 11/1995 | Conrad et al. |
| 5,781,650 A | | 7/1998 | Lobo et al. |
| 5,973,732 A | | 10/1999 | Guthrie |
| 6,104,966 A | | 8/2000 | Haagensen |
| 6,166,729 A | | 12/2000 | Acosta et al. |
| 6,208,260 B1 | | 3/2001 | West et al. |
| 6,283,860 B1 | | 9/2001 | Lyons et al. |
| 6,392,546 B1 | | 5/2002 | Smith |
| 6,600,475 B2 | | 7/2003 | Gutta et al. |
| 6,650,242 B2 | | 11/2003 | Clerk et al. |
| 6,697,104 B1 | | 2/2004 | Yakobi et al. |
| 6,853,303 B2 | | 2/2005 | Chen et al. |
| 6,970,574 B1 | | 11/2005 | Johnson |
| 7,015,816 B2 | | 3/2006 | Wildman et al. |
| 7,019,652 B2 * | | 3/2006 | Richardson ............ 340/573.1 |
| 7,065,645 B2 | | 6/2006 | Teicher |
| 7,317,830 B1 * | | 1/2008 | Gordon et al. ............ 382/173 |
| 7,319,399 B2 | | 1/2008 | Berg |
| 7,375,640 B1 | | 5/2008 | Plost |
| 7,464,001 B1 | | 12/2008 | Adams |
| 7,495,569 B2 | | 2/2009 | Pittz |
| 7,534,005 B1 * | | 5/2009 | Buckman ................ 362/105 |
| 7,689,465 B1 | | 3/2010 | Shakes et al. |
| 7,832,396 B2 * | | 11/2010 | Abernethy ........... 128/201.29 |
| 8,208,681 B2 * | | 6/2012 | Heller et al. ............... 382/100 |
| 8,279,277 B2 * | | 10/2012 | Nam et al. .................. 348/77 |
| 2002/0190866 A1 * | | 12/2002 | Richardson ............... 340/632 |
| 2003/0058111 A1 | | 3/2003 | Lee et al. |
| 2003/0061005 A1 | | 3/2003 | Manegold et al. |
| 2003/0093200 A1 | | 5/2003 | Gutta et al. |
| 2003/0163827 A1 * | | 8/2003 | Purpura ...................... 725/105 |
| 2003/0169906 A1 | | 9/2003 | Gokturk et al. |
| 2003/0184649 A1 * | | 10/2003 | Mann ......................... 348/161 |
| 2005/0027618 A1 | | 2/2005 | Zucker et al. |
| 2005/0094879 A1 | | 5/2005 | Harville |
| 2005/0248461 A1 | | 11/2005 | Lane et al. |
| 2006/0033625 A1 | | 2/2006 | Johnson et al. |
| 2006/0219961 A1 | | 10/2006 | Ross et al. |
| 2006/0220787 A1 | | 10/2006 | Turner et al. |
| 2006/0244589 A1 * | | 11/2006 | Schranz .................... 340/539.22 |
| 2006/0272361 A1 | | 12/2006 | Snodgrass |
| 2007/0018836 A1 * | | 1/2007 | Richardson ............... 340/622 |
| 2007/0122005 A1 * | | 5/2007 | Kage et al. ................. 382/115 |
| 2008/0001763 A1 | | 1/2008 | Raja et al. |
| 2008/0031838 A1 | | 2/2008 | Bolling |
| 2008/0136649 A1 | | 6/2008 | Van De Hey |
| 2008/0189142 A1 | | 8/2008 | Brown et al. |
| 2008/0189783 A1 * | | 8/2008 | Music et al. ................. 726/17 |
| 2008/0247609 A1 * | | 10/2008 | Feris et al. .................. 382/118 |
| 2009/0040014 A1 | | 2/2009 | Knopf et al. |
| 2009/0051545 A1 | | 2/2009 | Koblasz |
| 2009/0079822 A1 | | 3/2009 | Yoo et al. |
| 2009/0128311 A1 | | 5/2009 | Nishimura et al. |
| 2009/0135009 A1 | | 5/2009 | Little et al. |
| 2009/0161918 A1 * | | 6/2009 | Heller et al. ............... 382/115 |
| 2009/0195382 A1 | | 8/2009 | Hall |
| 2009/0224868 A1 | | 9/2009 | Liu et al. |
| 2009/0224924 A1 | | 9/2009 | Thorp |
| 2009/0237499 A1 | | 9/2009 | Kressel et al. |
| 2009/0273477 A1 | | 11/2009 | Barnhill |
| 2010/0155416 A1 | | 6/2010 | Johnson |
| 2010/0167248 A1 * | | 7/2010 | Ryan ........................... 434/262 |
| 2010/0183218 A1 * | | 7/2010 | Naito et al. ................. 382/159 |
| 2010/0245554 A1 * | | 9/2010 | Nam et al. ..................... 348/77 |
| 2012/0062725 A1 * | | 3/2012 | Wampler et al. ............. 348/86 |
| 2012/0146789 A1 * | | 6/2012 | De Luca et al. ............ 340/540 |

FOREIGN PATENT DOCUMENTS

| | | |
|---|---|---|
| WO | 99/32959 | 7/1999 |
| WO | 2007/090470 A1 | 8/2007 |
| WO | 2007/129289 A1 | 11/2007 |
| WO | 2008/152433 A1 | 12/2008 |
| WO | 2010/026581 A2 | 11/2010 |

OTHER PUBLICATIONS

Face and Hand Gesture Recognition Using Hybrid Classifiers, Gutta et al, Dept. of Computer Science, George Mason University, 6 pages (1996).

Maximum Likelihood Face Detection, Colmenarez et al, University of ILL, 4 pages, (1996).

Video Sequence Interpretation for Visual Surveillance, Rota et al, pp. 1-9 (2000).

A Line-Scan Computer Vision Algorithm for Identifying Human Body Features, Lyons et al, Philips Research, pp. 1-8 (1999).

Application of the Self-Organizing Map to Trajectory Classification, Owens et al, School of Computing and Engineering Technology, University of Sunderland, pp. 1-7 (2000).

Detecting Human Faces in Color Images, Yang et al, Beckman Institute and Department of Electrical and Computer Engineering, University of ILL, 4 pages (1998).

A. Criminisi, A. Zisserman, L. Van Gool, Bramble S., and D. Compton, "A New Approach to Obtain Height Measurements from Video", *Proc. of SPIE*, Boston, Massachussets, USA, vol. 3576, pp. 227-238 (Nov. 1-6, 1998).

A Revolution in Traceability, Foodproductiondaily.com, 1 page, (Mar. 10, 2004).

Eye in the Sky (camera), Wikipedia, 1 page (Dec. 11, 2009).

Edge Detection, Wikipedia, 8 pages (Feb. 10, 2010).

Corner Detection, Wikipedia, 12 pages (Feb. 9, 2010).

Evolution Robotics, 3 pages (2001-2005).

Athanasia et al, "P1714 Compliance of healthcare workers with hand hygiene rules in the emergency room of two tertiary hospitals in the area of Athens", International Journal of Antimicrobial Agents, Elsevier Science, Amsterdam, NL, vol. 29, Mar. 1, 2007, p. S486, SP022038903, ISSN: 0924-8579, DOI:DOI:10.1016/S0924-8579(07)71553-4.

Chapter 17: "Beyond one Still Image: Face Recognition from Multiple Still Images or a Video Sequence"; In: Shao, Wenyi (Ed.); Chellappa, Rama (Ed.): "Face Processing—Advanced Modeling and Methods", Academic Press/Elsevier, US, UK 313230, XP002639937, ISBN: 978-0-12-088452-0, pp. 547-575.

Grange, Sebastian, Baur, charles: Robust Real-time 3D Detection of Obstructed Head and Hands in Indoors Environments:, J. Multimedia, vol. 1, No. 4, Jul. 2006, pp. 29-36, XP002639938, US.

United States Department of Agriculture: "Machine Vision sees food contamination we can't see", Agricultural Research Magazine, vol. 50, No. 8 Aug. 2002, XP8137410, US, retrieved from the internet: URL:http://www.ars.usda.gov/is/AR/archive/aug02/food0802.pdf {retrieved on May 31, 2011].

Bhatt J et al: "Automatic recognition of a baby gesture", Proceedings 15th IEEE International Conference on Tools with Artificial Intelligence. ICTAI 2003. Sacramento, CA, Nov. 3-5, 2003; Los Alamitos, CA, IEEE Comp. Soc, US, vol. CONF. 15, Nov. 3, 2003, pp. 610-615, XP010672284, DOI: DOI:10.1109/TAI.2003.1250248 ISBN: 978-0-7695-2038-4.

Lohr, S., "Couputers That See You and Keep Watch Over You," The New York Times, 5 pp, Jan. 1, 2011.

"GE Healthcare's Smart Patient Room to Begin Data Collection," 3 pages, Sep. 15, 2010.

* cited by examiner

AUTOMATED MONITORING AND CONTROL OF CONTAMINATION IN A PRODUCTION AREA

This application claims the benefit of, and incorporates by reference the entirety of Provisional Application No. 61/134,655 filed Apr. 1, 2010.

BACKGROUND

The invention is directed to automated monitoring and control of contamination in a production area, particularly automated monitoring and control of contamination of the production area by an individual working in the production area.

Contamination of a production area by workers can occur if, for example, a worker handles food product without wearing sterile gloves, or without wearing a hair net. Contamination of a production area, particularly contamination of product being produced in a production area, can easily occur in a wide variety of industries, where hygiene is needed to prevent contamination by biological contaminants and other contaminants. Such industries include the food industry, the pharmaceutical industry, hospitals, doctors' offices, outpatient clinics, and other health-services and health-product related industries, in which microbial and other contamination can have adverse consequences on the consumer of the services and/or products.

Yet other industries require contamination-free, high purity production environments because contamination can negatively impact the function and/or aesthetics of the resulting product. One such industry is the manufacture of semiconductor devices, microelectronics, microchips, and integrated circuits. Another industry in which contamination negatively impacts product quality is the coating (e.g., painting) of various products, including automotive, furniture, construction, and other products, in which contaminants adversely affect the appearance, feel, or durability of the coating applied to the product. The presence of skin oils, airborne dust, and other contaminants from workers can result in product defects during one or more phases of the manufacturing process.

Although there are numerous vendors supplying the market with contamination control equipment (hereinafter, "CCE") such as gloves, face masks, hair nets, aprons, gowns, etc., and although employers require employees to wear CCE, the cost of contamination in the workplace remains high. Manual monitoring of employees, vendors, and visitors through close circuit camera or direct supervision is both expensive and subjective. The overall reporting of violations can be inaccurate and unverifiable.

There is a need for a system that accurately monitors individuals as they work in a production area, to ensure that they wear required articles of CCE and to ensure that the required contamination-control protocol is followed to avoid contamination of products and/or injury to the ultimate consumer of the product.

SUMMARY

A first aspect of the invention is directed to an automated process for monitoring and controlling contamination in a production area. The process comprises capturing image data from the production area, processing the image data, and activating a contamination control device if the article of contamination control equipment is not present and properly positioned on the individual while the individual is working in the production area. The image data is processed to determine: (i) whether an individual is present within the production area in which the individual is to be wearing an article of contamination control equipment; and (ii) whether the article of contamination control equipment is present and properly positioned on the individual while the individual is working in the production area.

In an embodiment, the contamination control equipment comprises at least one member selected from the group consisting of a glove, a face mask, a suit, a gown, and a hair net.

In an embodiment, the image data is captured by scanning at least a portion of the production area with a camera.

In an embodiment, activating of the contamination control device comprises activating at least one member selected from group consisting of: (i) a means for contamination control, (ii) an alarm to notify the individual that the at least one article of contamination control equipment is not present or is not properly positioned, (iii) the generation of a report that the article of contamination control equipment was not present while the individual was present in the production area, or was not properly positioned while the individual was present in the production area.

In an embodiment, the means for contamination control comprises at least one member selected from the group consisting of: (i) cutting off power to at least one machine in the production area, and (ii) interjecting a physical restraint or barrier between the individual and the machine in the production area.

In an embodiment, activating the contamination control device comprises setting off the alarm, and the alarm comprises at least one member selected from the group consisting of an audible alarm, a visual alarm, and a vibratory alarm. The transmission of the report can comprise at least one member selected from the group consisting of transmission of an electronic report and transmission of a hard copy report.

In an embodiment, the image data can be captured over a time period, with the processing of the image data being carried out to find an image of at least a portion of an individual in motion, using a stabilization algorithm to determine whether the image data satisfies a threshold image value for a threshold time period, with the threshold image value being a pre-determined minimum image value correlating with an absence of the contamination control equipment properly positioned on the individual, and the threshold time period being a pre-determined minimum time period that the threshold image value is satisfied, with the contamination control device being activated if the threshold image value is satisfied for the threshold time period. In an embodiment, the activating of the contamination control device comprises activating at least one member selected from group consisting of: (i) a means for contamination control; (ii) an alarm to notify the individual that the at least one article of contamination control equipment is not present or is not properly positioned; and (iii) the generation of a report that the article of contamination control equipment was not present while the individual was present in the production area, or was not properly positioned while the individual was present in the production area. In an embodiment, the report includes an image of the individual in the work zone while the threshold image value is satisfied for the threshold time period, and a notation of a time at which the image was captured.

A second aspect is directed to an automated system for monitoring and controlling contamination in a production area. The system comprises a computer, an imaging sensor in communication with the computer, the imaging sensor being configured and arranged to capture image data of at least a portion of the production area, and a computer-readable program code disposed on the computer. The computer-readable program code comprises: (i) a first executable portion for processing image data and creating an image of the production area, (ii) a second executable portion for processing image data to find an image of an individual or a portion of an individual in the production area, (iii) a third executable portion for processing image data and determining whether an article of contamination control equipment is present in association with the image of the individual or the image of the portion of the individual, (iv) a fourth executable portion for processing image data and determining if the article of contamination control equipment is properly positioned on the individual while the individual is in the production area, (v) a sixth executable portion for activating a contamination control device if the article of contamination control equipment is not present and properly positioned on the individual while the individual is present in the production area. The second aspect can utilize any feature the various embodiments of the first aspect can utilize, and vice versa.

In an embodiment, at least one member selected from the production area, the individual, and the article of CCE has secondary or supplemental source of data, such as an identifiable symbol, text marking, coloration, RFID tag, etc.

In an embodiment, the automated system further comprises a seventh executable portion comprising a stabilization algorithm to determine whether the image data satisfies a threshold image value for a threshold time period, with the threshold image value being a pre-determined minimum image value correlating an absence of the contamination control equipment properly positioned on the individual, and the threshold time period being a pre-determined minimum time period that the threshold image value is satisfied.

In an embodiment, the imaging sensor is a first imaging sensor and the system further comprises a second imaging sensor in communication with the computer, with the computer-readable program code disposed on the computer being provided with executable first, second, third, and fourth executable portions for creating and processing image data of at least a portion of the production area from the second imaging sensor, with the creating and processing of the image data from the second imaging sensor being carried out in a manner corresponding with the executable portions for capturing and processing image data from the first imaging sensor.

In an embodiment, the imaging sensor is a scanning imaging sensor configured and arranged to scan a production area.

In an embodiment, the automated system further comprises a data entry device that is in communication with the computer.

In an embodiment, a secondary image data capturing/processing system can be used to obtain and process data from a selected area of the field of view monitored by a primary image data capturing/processing system. The primary image data capturing/processing system, which is utilized to identify personnel, CCE, and activate one or more CC devices, can also be used to direct the secondary image data capturing/processing system. The secondary image data capturing/processing system can include hyperspectral imaging systems, thermal imaging systems, radio frequency detection devices, microwave detection devices, colorimetric detection devices, gas chromatography, as well as electromechanical focusing equipment.

The data processing of the primary image data capturing/processing system can be designed to activate the secondary image data capturing/processing system upon the detection of a condition that the secondary image data capturing/processing system has the capability to further assess in a desired manner. The data processing of the primary image data capturing/processing system can be designed to activate the secondary image data capturing/processing system upon the detection of a condition that the secondary image data capturing/processing system has the capability to further assess in a desired manner.

For example, a primary image data capturing/processing system can be used to monitor a work area at a sandwich shop, find an individual working behind a counter, and then subsequently define the arms and hands of a person that is making a sandwich. The primary image data capturing/processing system may determine whether the individual is wearing gloves and may then subsequently activate a secondary image data capturing/processing system utilizing a hyperspectral imaging camera (e.g., a HySpex™ hyperspectral camera such as HySpex™ model VNIR-640s hyperspectral camera available from Norsk Elektro Optikk AS), to observe just the defined hand area and determine if the hands are contaminated with bacteria such as *ecoli*; further enabling the activation of an alarm system if the bacteria is found. This parallel process with selective focusing multiple cameras increases the speed and efficiency with which data can be analyzed.

In an embodiment, the automated system further comprises a printer that is in communication with the computer and is capable of printing a report of a determination of whether contamination control equipment is properly positioned on the individual in the production area.

DETAILED DESCRIPTION

Figure 1:
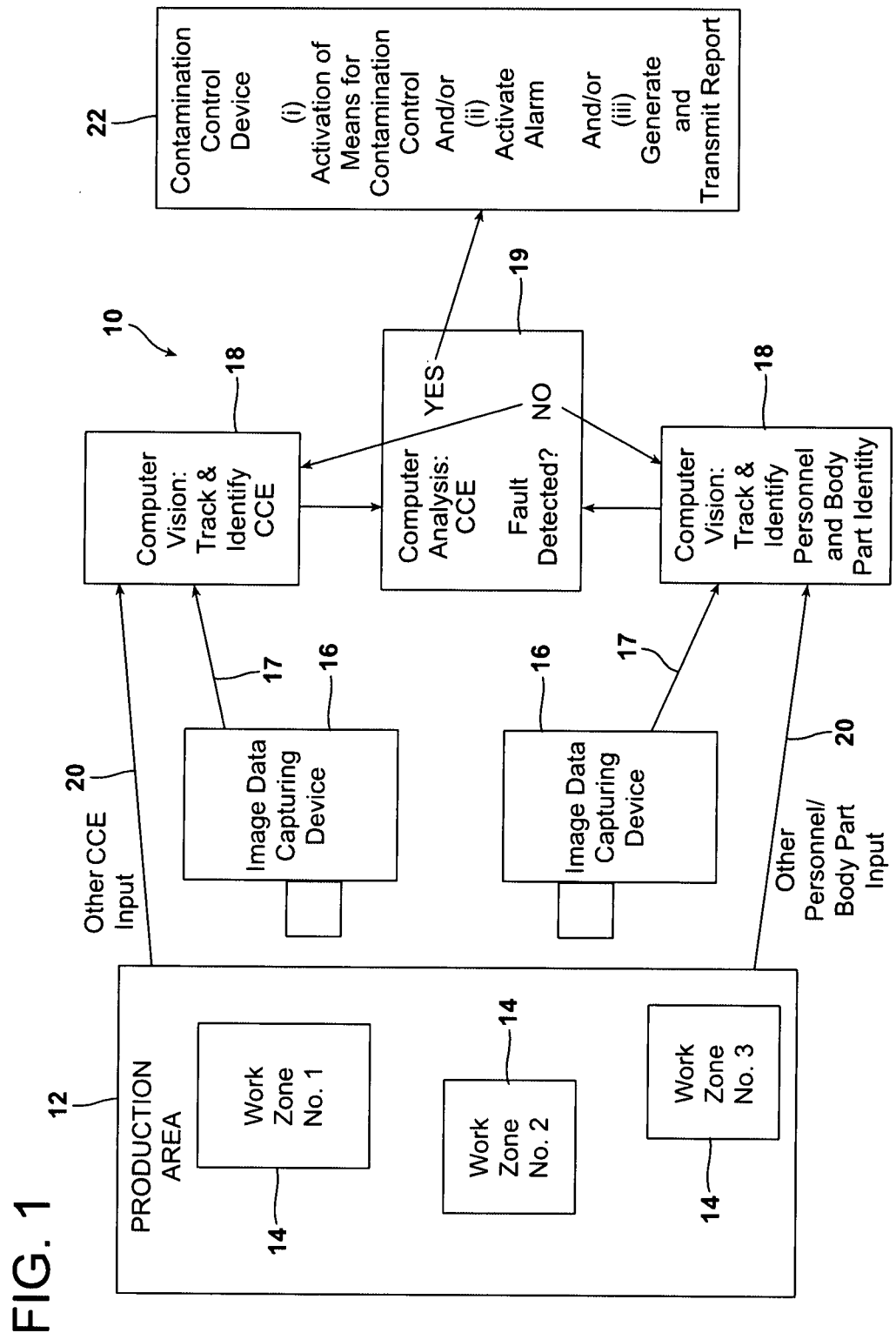
FIG. 1 is a schematic diagram illustrating an automated machine vision process and system for monitoring and controlling contamination in a production area through the monitoring and control of the wearing of one or more articles of CCE by one or more individuals in a production area.

As used herein, the phrase "automated process" is used with reference to processes utilizing computer vision and/or machine vision in obtaining and processing image data. The image data is captured using one or more imaging sensors in communication with a computer. While the process can be carried out using only image data, additional data can be input from machine-readable or human-readable sensors and identifiers, radio frequency identification transponder (RFID) or other transmitting sensors, time stamps or biometric identification, object recognition, texture definition, database management and other software, data interface equipment consisting of serial, parallel, or network communication, binary data such as switches, gates, push buttons, current sensors, as well as additional forms of data input. One or more computers can process image data and optionally other data from other sensors, identifiers, etc., using algorithms designed to determine whether the computer is to activate a control device, particularly a contamination control device (hereinafter "CC device").

As used herein, the phrase "imaging sensor" refers to a component of a vision system that captures image data, e.g., a camera or other image capturing device. In computer vision and machine vision systems, one or more imaging sensors are configured and arranged to capture image data of a one or more objects within the production area. Imaging sensors include analog video cameras, digital video cameras, color and monochrome cameras, closed-circuit television (CCTV) cameras, charge-coupled device (CCD) sensors, complementary metal oxide semiconductor (CMOS) sensors, analog and digital cameras, PC cameras, pan-tilt-zoom cameras (PTZ), web cameras, infra-red imaging devices, and any other devices that can capture image data. The selection of the particular camera type for a particular facility may be based on factors including environmental lighting conditions, the frame rate and data acquisition rate, and the ability to process data from the lens of the camera within the electronic circuitry of the camera control board, the size of the camera and associated electronics, the ease with which the camera can be mounted as well as powered, the lens attributes which are required based on the physical layout of the facility and the relative position of the camera to the objects, and the cost of the camera. Exemplary cameras that may be used in the practice of the invention are available from Sony such as Sony Handycam Camcorder model number DCR-SR80.

Image data is captured and processed to determine the presence of one or more individuals, as well as in the presence of one or more articles of CCE. Image data can be processed in a manner to determine whether an article of CCE is being properly worn by an individual. Upon determination that a required article of CCE is not in place, the computer can be programmed to send a signal that automatically activates a CC device.

Since motion takes place over a period of time, processing of image data to determine individuals in motion requires capturing image data over a period of time. Differences in location and/or conformation of objects as a function of time allows the computer to process image data in a manner that distinguishes moving objects from non-moving background. Image data can also be processed using one or more threshold values to determine whether there is a violation of one or more predetermined standards for a controlled contamination production area (hereinafter "CCPA"), with activation of a CC device in the event that the predetermined standard is being violated.

The computer system, i.e., one or more computers, can be programmed to process the image data to identify individuals as well as other objects in motion, and separate the moving objects from the non-moving background images. The computer system can be programmed to distinguish images of individuals from images of other moving objects. The computer system can be programmed to process image data for individuals required to be wearing CCE, and determine whether an individual is properly wearing a required article of CCE in a production area.

Computer-readable program codes include program modules, algorithms, rules, and combinations thereof. The computer system may include computer-readable program codes that process the image data of one or more objects being monitored, in order to perform one or more of the following functions: identifying an object being monitored; tracking an object as it moves within the production area; locating an object in the production area; and associating information with an object. The computer system may process image data utilizing program modules, algorithms, rules, and combinations thereof.

Computer vision may utilize one or more of the following: camera, computer, object recognition and tracking using blob analysis, texture definition, data base management and other software, data interface equipment consisting of serial, parallel, or network communication, specific activity based, founding data originating from the person or CCE (containing information on the individual or the CCE), and integration of other discrete characterization data such as RFID tags, binary data such as switches, gates, push buttons, or current sensors.

The computer vision system may utilize an algorithm model or vision-based software to correctly identify a person from the environment. This may involve the use of multiple cameras and the geometric correlation of the perspective of a plurality of cameras having overlapping views or views from different perspectives. Algorithms such as the background subtraction method, Canny imaging, Harris corner imaging, Shen-Castan edge detection, grey level segmentation, skeletonization, etc., can be used to process image data in a manner that identifies the visual features of a person, e.g., eyes, ears, nose, head, arms, hands, and other body parts. See also J. R. Parker, "Algorithms for Image Processing and Computer Vision, John Wiley & Sons, (1997), and D. A. Forsyth and J. Ponce, "Computer Vision a Modern Approach", Prentiss Hall (January 2003), both of which is hereby incorporated in their entireties, by reference thereto.

Using the same types of vision algorithms applied for tracking people, the safety equipment is further identified and associated to the person and the environment in which the CCE is required. Monitoring of both the initially-tracked individual and his immediate association with one or more articles of CCE can be done simultaneously. The coupling of data from auxiliary equipment from markers such as RFID tags, physical interface monitors, and electronic controls (such as in-line current sensing units) to the CCE and the person provides additional monitoring capability.

The software's recognition of actions may trigger parent-child relationships to other pieces of equipment and the analysis of a continuous stream of data from the cameras may initiate additional correlations of the individual as he moves through a monitored area. The interface summary and detection data may be printed to a report, burned to an electronic chip, or compact disc or other storage device or stored in a computer database and referenced by a unique identifier including name, CCE type or location.

Image data can be processed using video content analysis (VCA) techniques. For a detailed discussion of suitable VCA techniques, see, for example, Nathanael Rota and Monique Thonnat, "Video Sequence Interpretation for Visual Surveillance," in Proc. of the 3d IEEE Int'l Workshop on Visual Surveillance, 59-67, Dublin, Ireland (Jul. 1, 2000), and Jonathan Owens and Andrew Hunter, "Application in the Self-Organizing Map to Trajectory Classification," in Proc. Of the 3d IEEE Int'l Workshop on Visual Surveillance, 77-83, Dublin, Ireland (Jul. 1, 2000), both of which are hereby incorporated by reference. Generally, the VCA techniques are employed to recognize various features in the images obtained by the image capture devices.

The computer system may use one or more Item Recognition Modules (IRM) to process image data for the recognition of a particular individual or other object in motion, and/or an article of CCE. In addition, the computer system may use one or more Location Recognition Module (LRM) to determine the location of a particular individual or other object in motion, or an article of CCE. In addition, the computer system may use one or more Movement Recognition Modules (MRM) to process movement data for the recognition of a particular individual or other object in motion, or article of CCE. The computer may use IRM in combination with LRM and/or MRM in identifying and tracking movements of particular individual or other object in motion, or article of CCE for the purpose of assessing velocity of movement and/or conformational movement characteristics, as well as in assessing whether contamination control requirements are being violated. The IRM, LRM, and MRM can be configured to operate independently or in conjunction with one another.

The image data can be analyzed using human classification techniques that can be employed for the purpose of confirming whether an object is a human, as well as for analyzing the facial features. Face detection may be performed in accordance with the teachings described in, for example, any one or more of the following, each of which is incorporated, in its entirety, by reference thereto: International Patent WO 9932959, entitled "Method and System for Gesture Based Option Selection", and Damian Lyons and Daniel Pelletier, "A line-Scan Computer vision Algorithm for Identifying Human Body Features," Gesture '99, 85-96 France (1999); M. H. Yang and N. Ahuja, "Detecting Human Faces in Color Images", *Proc. Int'l Conf. IEEE Image Processing*, pp. 127-139, October 1998; I. Haritaoglu, D. Harwood, L. Davis, "Hydra: Multiple People Detection and Tracking Using Silhouettes," Computer Vision and Pattern Recognition, Second Workshop of Vidoe Surveillance (CVPR, 1999); A. Colmenarez and T. S. Huang, "Maximum Likelihood Face Detection", *International Conference On Face and Gesture Recognition*, pp 164-169, Kilington, Vt. (Oct. 14-16, 1996); Owens, J. and Hunter, A., "Application of the Self-Organising Map to Trajectory Classification", *Proc. 3$^{rd}$ IEEE International Workshop on Visual Surveillance, IEEE Comput. Soc*, Los Alamitos, Calif., USA, pages 77-83 (2000); N. Rota and M. Thonnat, "Video Sequence Interpretation For Video Surveillance, *Proceedings of the Third IEEE International Workshop on Visual Surveillance* (2000); Srinivas Gutta, Jeffrey Huang, Ibrahim F. Imam, Harry Wechsler, "Face and Hand Gesture Recognition Using Hybrid Classifiers", *Proceedings of the International Conference on Automatic Face and Gesture Recognition, ICAFGR* 96, 164-169, Killington (1996); and A. Criminisi, A. Zisserman, L. Van Gool, Bramble S., and D. Compton, "A New Approach To Obtain Height Measurements from Video", Proc. of SPIE, Boston, Mass., USA, volume 3576, pp. 227-238 (1-6 Nov. 1998).

As used herein, the phrase "production area" refers to any area in which an automated system is used in a process of monitoring and controlling sanitation as individuals and/or machines work in an environment to make any form of measurable progress. While a typical production area would be a factory in which articles of manufacture are being produced, the phrase "production area" includes restaurants, gas stations, construction sites, offices, hospitals, etc., i.e., anywhere a product is being produced and/or a service is being rendered. The criteria for controlling contamination of a production area depend upon the particular nature of the production area, i.e., what articles are being produced and/or services offered, and the contamination control requirements associated with those products and/or services. With regard to minimizing the amount of contamination in any specified area, the area could also be referred to as a "sanitation area".

As used herein, the phrase "work zone" refers to a discrete area that can correspond with an entire production area, one or more discrete regions of a production area, or even an entire production area plus an additional area. Different regions within a production area can have different contamination control requirements. For example, a first work zone could include only a defined area immediately surrounding a particular machine in a factory. The contamination control requirements for the machine operator and others within a specified distance of the machine may be greater than the contamination control requirements just a few meters away from the machine. A factory can have many different work zones within a single production area, such as 2-100 work zones, 2-50 work zones, or 2-10 work zones. Alternatively, a factory can have uniform CCE requirements throughout the production area, which can be one single work zone.

As used herein, the phrase "contamination control equipment" (i.e., "CCE") refers to any article to be worn by an individual for the purpose of controlling the emission of contamination from the individual into the production environment. As such, articles of CCE include face masks, gloves, gowns, suits, aprons, hair nets, etc.

As used herein, the phrase "contamination control device" (i.e., "CC device") includes any device that, when activated, is designed to prevent, reduce the likelihood of, or reduce the degree of, the release of contamination from the individual into the production area. The CC device can be designed to immediately prevent the release of contamination and/or reduce the likelihood of the release of contamination, and/or reduce the degree of contamination released by the individual.

For example, the activation of the CC device could discontinue power to a machine, or interject a physical barrier or restraint between an individual and product that could be contaminated. Alternatively, the CC device could provide a more delayed effect on prevention or reduction of contamination. For example, the CC device could be in the form of an alarm to alert one or more individuals of the heightened risk of contamination associated with the absence of a required article of CCE on an individual within the production area. The individuals could be left to decide how to address the condition in response to the alarm. Alternatively, the CC device could generate and transmit a report to a production manager, agent, safety officer, etc., for the purpose of modifying behavior so that the absence of the required article of CCE would be less likely to occur in the future.

As used herein, the term "movement" includes movements of objects in which the location of the center of gravity of the individual or object changes, as well as movements in which the center of gravity does not change, but the conformation of the individual or object changes. Changes in the location of the center of gravity of an individual or object in an ascertainable time period correlate with the velocity of the individual or object. "Conformational movements" are movements in which there is a substantial change in the location of the individual or object, but only a small (or no) change in the location of the center of gravity of the individual or object.

The automated process for monitoring and controlling contamination in a production area utilizes algorithm-based computer vision to: (i) identify an individual or a portion of an individual; (ii) identify whether a required article of CCE is present in association with the individual or the portion of the individual, and/or determine whether the individual or portion of the individual has the required article of CCE properly positioned thereon; (iii) send a signal to automatically activate a CC device in the event that the required article of CCE is not present in association with the individual or the portion of the individual, and/or that the required article of CCE is not properly positioned on the individual or portion of the individual.

One or more embodiments of the present invention now will be described with reference to the accompanying drawings, in which some, but not all embodiments of the invention are shown. The invention may be embodied in many different forms and should not be construed as limited to the embodiments set forth herein. Rather, these embodiments are provided so that this disclosure will satisfy applicable legal requirements. Like numbers refer to like elements throughout.

FIG. 1 is a schematic diagram illustrating an automated machine vision process and system 10 for monitoring and controlling contamination in a production area through the monitoring and control of the wearing of one or more articles of CCE by one or more individuals in a production area. Computer vision system 18 for monitoring and controlling contamination in production area 12 captures and processes data related to one or more individuals wearing CCE. Production area 12 has multiple work zones 14 therein. Although image data capturing devices 16 (e.g., cameras) are shown outside of production area 12, they could be within production area 12. The one or more image data capturing devices 16 could be within production area 12 but not within any of work zones 14, or some or all image data capturing devices 16 could be within one or more of work zones 14. Image data capturing devices 16 provide image data input to one or more computer vision system 18 with data tracking and identifying personnel or body parts thereof including location in production area 12, as well as whether an individual is within one of work zones 14. In addition to data provided by image data capturing devices 16, other CCE-related data can be provided to computer vision system(s) 18 via other data input means such as symbolic alpha, or numeric information embodied in or on a machine or machine-readable or human-readable identifier such as a tag or label (e.g., bar coded tag or label), a hole pattern, a radio frequency identification transponder (RFID) or other transmitting sensors, machine readable sensors, time stamps or biometric identification, CCE markers or designs or coloration, etc., as illustrated by other input data 20 from production area 12.

The resulting automated process system 10 provides data that is compared to predetermined fault criteria programmed into the one or more fault-detection analysis computer 19. The fault criteria are met if an individual is present in the production area 12 and/or one or more of work zones 14 without wearing one or more articles of CCE required for the respective production area 12 or work zone 14, or without having the one or more required articles of CCE properly positioned while the individual is in the respective production area 12 or work zone 14. If computer vision system 18 in combination with fault-detection computer 19 determine that one or more individuals are not wearing the required article(s) of CCE in respective production area 12 or work zone 14, and/or if the automated process determines that required article(s) of CCE are not properly positioned on the one or more individuals in the production area 12 or work zone 14, data input from computer vision system 18 to fault-detection computer 19 results in the assessment of the existence of a fault, causing fault-detection computer 19 to trigger contamination control device 22. Contamination control device 22 takes one or more actions selected from the group consisting of (i) activating a contamination control means, (ii) activating an alarm, and (iii) activating the generation and transmission of a report of a violation of contamination control protocol.

If the automated process is directed to the presence and proper use of a face mask, the machine vision system can be designed to view the scene and detect the face of an individual and perform segmentation based on proportionality to find the eyes. The machine vision system can be designed to find features associated with the face mask (including color mismatch, etc) and can be designed to remove non-moving objects, and zoom and/or read information on associated objects or persons and activate electromechanical circuit(s).

If the automated process is directed to the presence and proper use of one or more gloves (or any other form of safety equipment for one or both hands), the machine vision system can be designed to view the scene and perform background subtraction and detect the face of an individual, and perform segmentation based on proportionality to find the arms of the individual, and perform segmentation based on proportionality to find the hands of the individual. The machine vision system can be designed to find features associated with gloves, including color mismatch, etc. The machine vision system can be designed to find features associated with one or more gloves (including color mismatch, etc) and can be designed to remove non-moving objects and zoom and/or read information on associated objects or individuals, and activate electromechanical circuit(s).

If the automated process is directed to the presence and proper use of a face mask, the machine vision system can be designed to view the scene and perform background subtraction and detect the face of an individual, and perform segmentation based on proportionality to find the mouth and nose of the individual. The machine vision system can be designed to find confirmation features associated with the face mask (including color mismatch, etc) and can be designed to remove non-moving objects and zoom and/or read information on associated objects or individuals, and activate electromechanical circuit(s).

If the automated process is directed to the presence and proper positioning of a hair net on an individual, the machine vision system can be designed to view the scene and perform background subtraction and detect the face of an individual, and perform segmentation based on proportionality to find the head of the individual. The machine vision system can be designed to find confirmation features associated with the presence or absence of a hair net, and can be designed to remove non-moving objects and zoom and/or read information on associated objects or individuals, and activate electromechanical circuit(s).

If the automated process is directed to the presence and proper use of gown (or a skirt or apron or any other form of safety equipment for the body of an individual), the machine vision system can be designed to view the scene and perform background subtraction and detect the body of an individual, and perform segmentation based on proportionality to find the hips, shoulders, and feet of the individual. The machine vision system can be designed to analyze proportionality ratios to confirm the presence or absence of the gown (including color mismatch, etc) and can be designed to remove non-moving objects and zoom and/or read information on associated objects or individuals, and activate electromechanical circuit(s).

Figure 2:
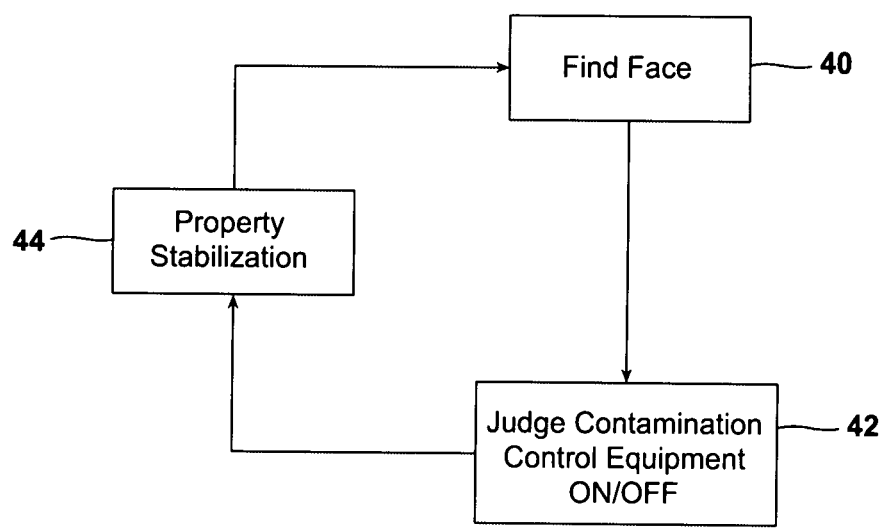
FIG. 2 is a representative schematic of loop process for determining whether one or more persons in a production area are properly wearing CCE.

FIG. 2 illustrates a representative schematic of loop process for determining whether one or more persons in a production area are properly wearing CCE to be placed on the face. The process of FIG. 2 includes: (i) primary data processing module 40 for finding a moving face within a production area, (ii) secondary data processing module 42 for determining the presence or absence of CCE such as a face mask on the associated face, as well as whether the CCE is properly positioned on the face, and (iii) tertiary data processing module 44 which utilizes a stabilization algorithm that tracks the face within the production area to ensure consistent data reporting.

Stabilization algorithm 44 completes a data processing feedback loop to prevent "false positives" from occurring. In the absence of stabilization algorithm 44, it can be difficult to set up the image capturing device and associated primary data processing module 40 and second processing module 42 so that together they consistently maintain an accurate determination of the presence or absence of properly positioned CCE on an individual in motion in the production area. The motion of the face, the motion of other objects in the production area, and various other factors have been determined to make it difficult to consistently make accurate determinations of the presence and placement of CCE on a moving face in the production area. As a result, inaccurate conclusions of non-compliance (i.e., "false positives") have been found to occur at a high rate, particularly when image data is being captured at a rate of, for example, 50 images per second. Single occurrences of images which show the presence of a face but which are inaccurately assessed by the data processing to be in the absence of CCE, can soar to thousands per hour. The stabilization algorithm of tertiary data processing module 44 requires a combination of (a) assessment of a pre-determined quality of image (i.e., a minimum image value) associated with the face in the absence of properly positioned CCE, and that this quality of image be present for at least a pre-determined minimum time period, before the system reports a CCE non-compliance event. In this manner, the process can be carried out using a stabilization algorithm that reduces the activation of a CC device due to a false positive to, for example, less than 0.1 percent of all determinations of non-compliance determinations. In addition, the images can be processed so that an image having a very high image quality correlating with non-compliance can be saved as a record of the non-compliance event. Optionally, it can have the date, hour, and location provided therewith, together with other data such as the duration of the period of non-compliance, etc.

The first step in the process of monitoring and controlling contamination in a production area associated with the use of CCE is to find the image of a face in motion in a production area. This can be carried out by using Haar-like feature detection. Alternatively, the number of skin pixels within a face region can be counted in assessing that a particular image is that of a face. In a third method, an image is determined to be something other than a face if dividing the number of skin pixels by the number of pixels in the face region produces a result less than a threshold value, otherwise it is a face.

Finding facial images of one or more individuals in a production area can be reasonably limited to finding images of faces in motion in the production area. This can be performed by computing the difference between the image of the face and the background image, in which:

$$Dif = \Sigma_{(within\ region)} |I-B|,$$

where I is object image, and B is background image. The image can be judged as non-moving if Dif is less than a pre-determined threshold. The background image can be assessed using low pass filtering over time, in which:

$$B = \tau B + (1-\tau) I,$$

where $\tau$ is a predetermined time constant, B is a low pass filtered background image, and I is an image.

Figure 3:
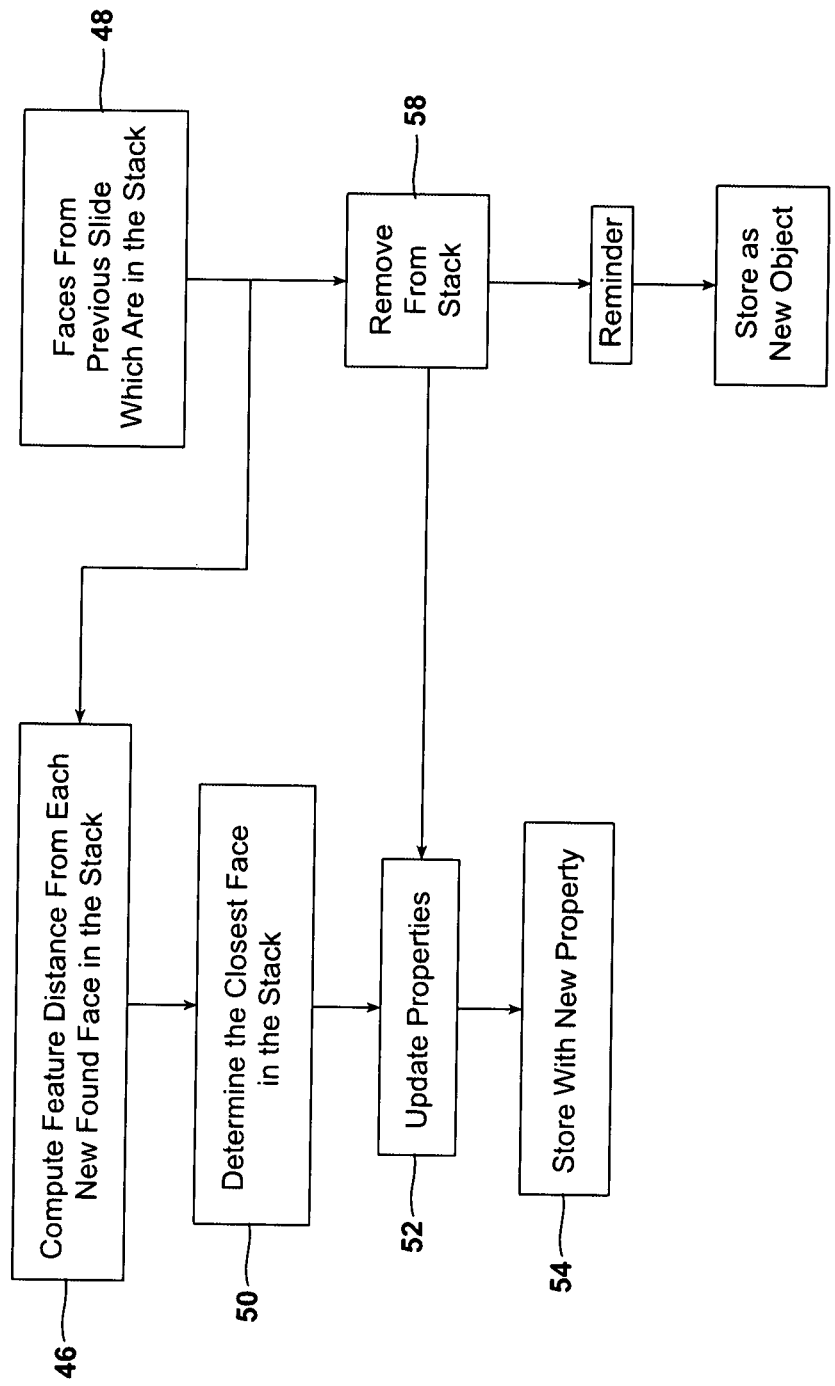
FIG. 3 is a representative schematic of a process for tracking images of individuals, or particular portions of individuals, in a production environment.

FIG. 3 illustrates a second step in the process, i.e., the step of tracking individual faces in the production area. As shown in FIG. 3 computation is made of the location of each face of the current image (46) and the locations of the features of the known faces in the previous image (48), i.e., distances are computed between each of the faces of the current image and the faces known from the image immediately preceding in time. Determinations are made as to which faces are closest to one another (50) between the faces in current image (46) and the faces in the immediately prior image (48). The speed of imaging is likely high enough (e.g., 200 milliseconds between images) that the likelihood is greatest that closest faces in the respective current and prior images in fact represent the same face. Locations and feature properties are then updated for the new image (52), and the new locations properties are stored (54). The old image of the production area including the old faces (48), can then be removed from the stack (58) (i.e., group) of closest faces in the current image (52), with faces of the new image then being stored together with the storage their new properties (54). A "reminder" is provided to ensure removal of the non-essential prior images of the faces.

The computation of feature distances can be carried out by evaluation of differences in facial position ($y_1$), differences in face size ($y_2$), and differences in color histogram differences ($y_3$). Feature distance D can be determined as:

$$D = y_1^2/\sigma_{y1}^2 + y_2^2/\sigma_{y2}^2 + y_3^2/\sigma_{y3}^2$$

where $\sigma_{y1}^2$, $\sigma_{y2}^2$, $\sigma_{y3}^2$ are pre-determined variances obtained from samples of the same object in continuous (i.e., successive) frames.

Properties can then be updated by characterization of the image life, i.e., by measurement of how long the image has been successfully tracked, by measurement of a low pass filtered determination of the CCE "on/off value" of the face, and by characterization of the features of the face, including position, size, and color histogram. Properties can be updated by the Increment Life value if the tracked face is associated with the face found in the current frame, as well as by Decrement Life if no face is associated to this tracked face. An example of determination of the low pass filter "on/off value" of the PPE on the face is as follows:

$$LPF \leftarrow \tau LPF + (1-\tau) status$$

here $\tau$ is a predetermined time constant.

Figure 4:
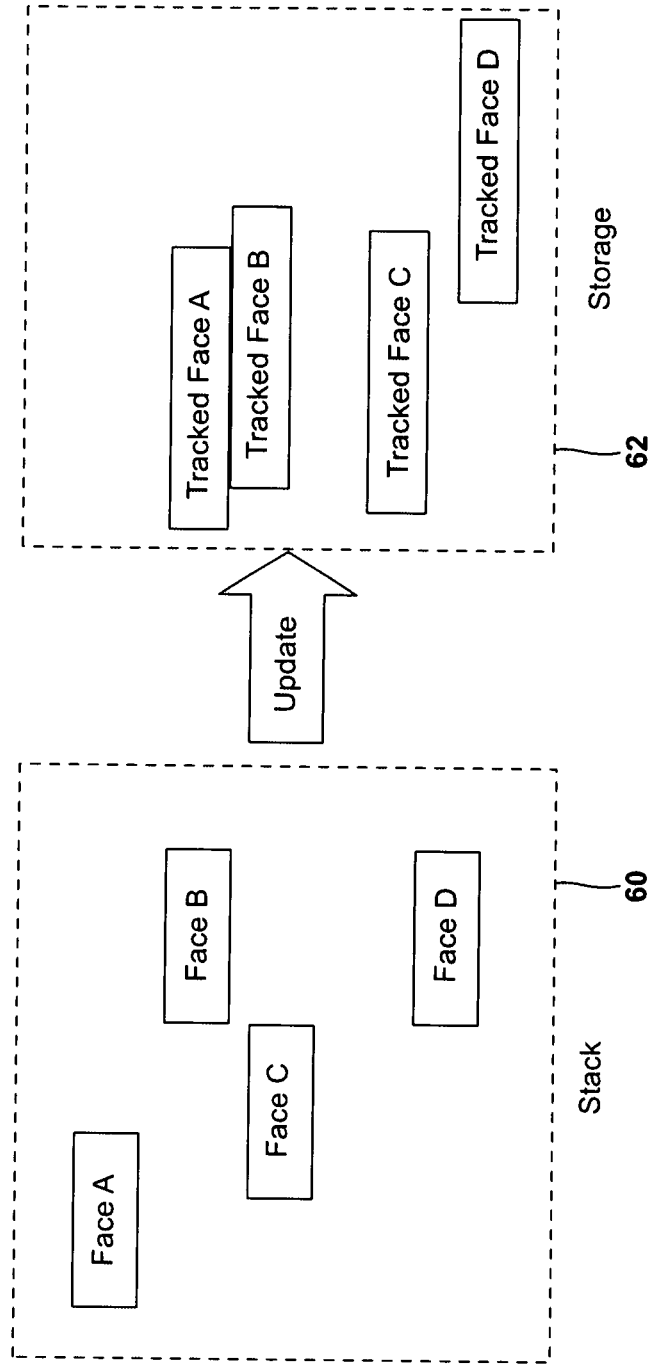
FIG. 4 is an illustration of the tracking of a plurality of faces in a given image from the production area.

FIG. 4 is an illustration of the tracking of a plurality of faces in a given image from the production area. Image 60 is taken at $T_1$. In image 60, Face A, Face B, Face C, and Face D appear at particular locations. Image 62 is taken at time $T_2$, a fraction of a second after $T_1$. Image 62 shows tracked Face A, tracked Face B, tracked Face C, and tracked Face D at particular locations of image 62. While tracked Face A and tracked Face B are in approximately the same locations at $T_2$ as at $T_1$, tracked Faces B and C appear in different positions at $T_2$, showing their relative movement between $T_1$ and $T_2$. As described above, the properties of each of Faces A-D include their "life" (i.e., how long they have been present in the image, including how long they have been present at or near their current location), the image value of the low pass filter PPE on/off value, their location (i.e., position), size, and color histogram. The update of the properties can be assessed by the increment life value, the decrement life, and the low pass filter on/off value, as described above.

Figure 5:
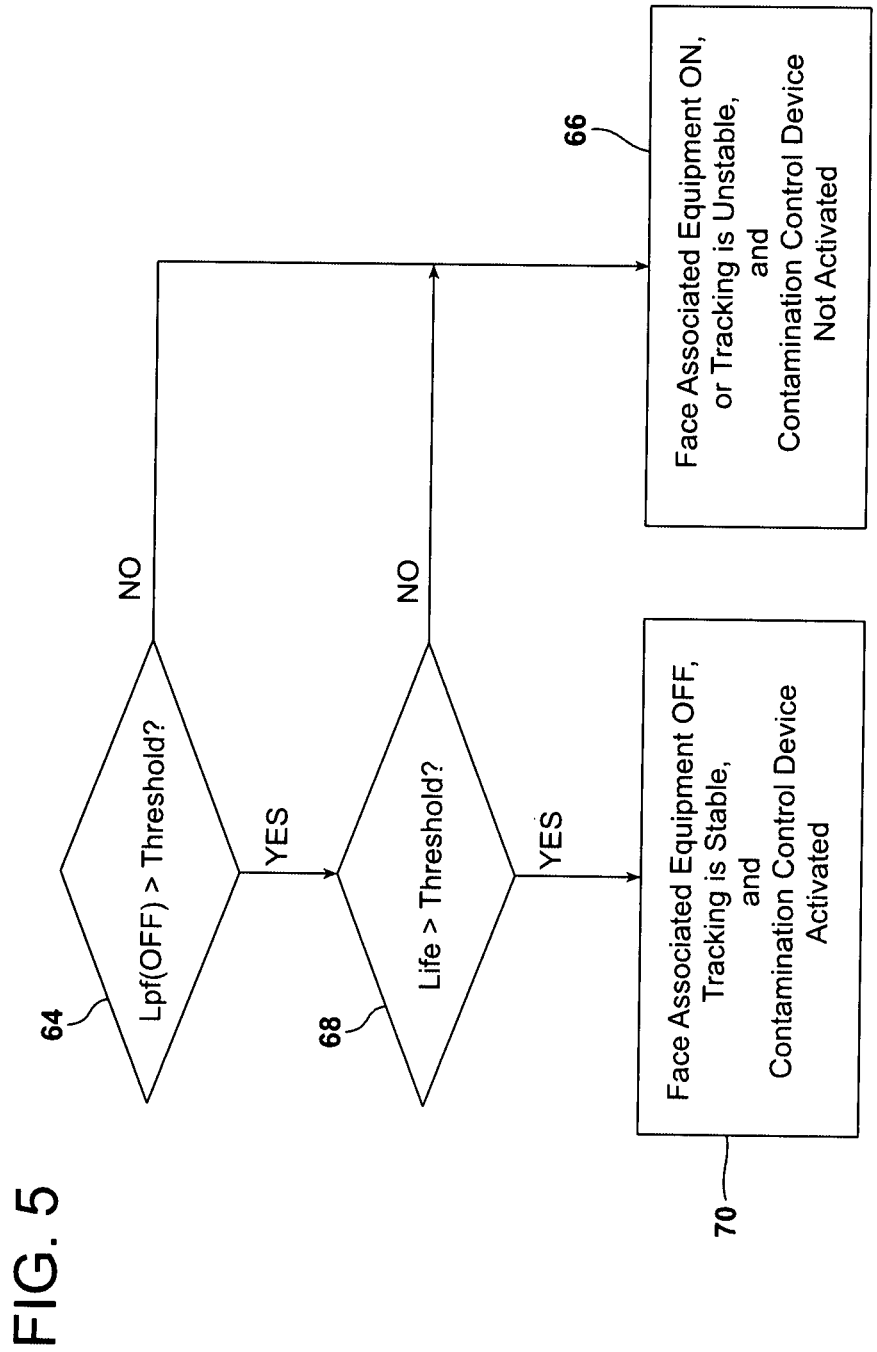
FIG. 5 is a representative schematic of the overall process for determining whether a tracked face is wearing an article of PPE.

FIG. 5 is a representative schematic of the overall process for determining whether a tracked face is wearing an article of CCE. This is the portion of the process and system that are designed to provide a data feedback loop to prevent "false positives" from occurring. In short, the feedback loop of the stabilization algorithm is set up to determine, with a high degree of accuracy, whether the face actually is wearing a required article of CCE in a manner conforming to contamination protocol within the production area. Without the use of the stabilization algorithm, a multitude of false positives have been found to occur when using image capturing and processing of faces in motion in a production area.

In FIG. 5, each tracked face is assessed using a low pass filter (64), assessing whether the image value corresponds with the face properly wearing the required article of CCE, or not properly wearing the required article of CCE. A pre-determined image value threshold is used in processing the image of the tracked face. If the image of the tracked face is such that the assessed image value is less than the threshold image value, the image is assessed as either being unstable or that the required article of CCE is being properly worn by the face (66). In such an instance, no safety control device is activated (66).

However, if the image value threshold is met during the low pass filter processing of the image of the tracked face (64), the processing is continued by assessing whether the time period over which the image value threshold is met is a time period that meets or exceeds a pre-determined threshold time period (68). If the image value threshold has not been met for the duration of the threshold time period, the result is that time no CC device is activated (66). However, if the threshold image value is satisfied for the threshold time period, a signal is sent that the face-associated CCE is "off" and that tracking is stable (70), with the result that a CC device is activated (70).

Various features of the tracked face can be assessed in order to determine the image value of the face. Markers on the CCE can be provided to assess the presence or absence of properly positioned CCE on the face. The markers can have particular color and intensity patterns located at pre-determined positions, relative to the face, making it easier to determine whether the required CCE is properly worn on the face. The measure of the marker existence can be $x_1$. For example, if marker is a blue marker, $x_1$ can equal the difference between the target number of pixels and the number of blue pixels.

Similarly, high intensity points can be assessed, as the number of high intensity points represents the reflection of face-associated equipment. For example, $x_2$ can equal the number of pixels having an intensity greater than a pre-determined threshold intensity value.

A horizontal edge under the eyes can also be assessed, as the existence of an edge, and the strength of the edge located pre-determined position under the eyes and relative to the face, corresponds with the presence of properly worn CCE (e.g., facemask) on the face. This can be assessed as follows:

$$x_3 = |I_1 - I_2|$$

where $I_2$ are pixel intensity located below eyes, with $I_1$ and $I_2$ being on the same horizontal axis but on different vertical axes.

Skin color can also be assessed as an indicator of whether CCE is properly positioned on the face, by determination of the ratio of pixels within skin color range in pre-determined range, relative to the face, e.g., where $x_4$=number of skin color pixels.

Skin color detection can be assessed as follows. First, for each pixel $p_1$=[R G B] and $p_2$=[R G B], pixel distance d is defined as $$d = (p_1 - p_2)' \Sigma (p_1 - p_2)$$

where $\Sigma$ is a matrix, in which inverse of covariance matrix is often used. N of pre-determined pixel sample represents skin: $(s_1, s_2, s_3, \ldots, s_N)$. Pixel distance $(d_1, d_2, d_3, \ldots, d_N)$ is computed from each pre-determined pixel $(s_1, s_2, s_3, \ldots, s_N)$. The minimum distance within N set of distances is found using: $d_{min} = \min\{d_1, d_2, d_3, \ldots, d_N\}$. Thresholding can be carried out using a pre-determined value th. If the distance is smaller than th, the pixel is skin, otherwise, the pixel is not skin.

Another method of skin color detection, which is faster, utilizes color vector analysis wherein p=[R G B], with pre-determined vectors $a_1, a_2, a_3, \ldots$ p is skin pixel if $$(a_1' p < th_1) \cap (a_2' p < th_2) \cap (a_3' p < th_3) \cap$$

In determining whether the face associated CCE is "ON" or "OFF", either of the following methods can be used. Using simple thresholding, assume features $x_1, x_2, x_3, x_4$ and pre-determined threshold $th_1, th_2, th_3, A_1$, judge face-associated CCE as "ON" if:

$$(x_1 > th_1) \cap (x_2 > th_2) \cap (x_3 > th_3) \cap (x_4 > th_4)$$

Otherwise, face-associated CCE is judged as "OFF".

The second method for determining whether the face associated CCE is "ON" or "OFF" utilizes Bayesian classifier:

$$x = [x_1 x_2 x_3 x_4]^T$$

Face-associated CCE is judged as "ON" if:

$$p_{ON}(x) > p_{OFF}(x)$$

where $p_{ON}(x)$ and $p_{OFF}(x)$ are probability functions predetermined by samples. Normal distribution is assumed.

A detailed method for monitoring and controlling contamination in a production area will now be described for a system for monitoring and controlling the use of gloves on an individual. The algorithm consists of several modules, specifically: (a) a primary module that finds a moving object from a background within a work environment; (b) a secondary algorithm that finds an arm blob from the primary object; (c) a judgment algorithm that determines whether the gloves are located on the arm blob; and (d) a optional stabilization algorithm using tracking and time life may to ensure accurate reporting.

Figure 6:
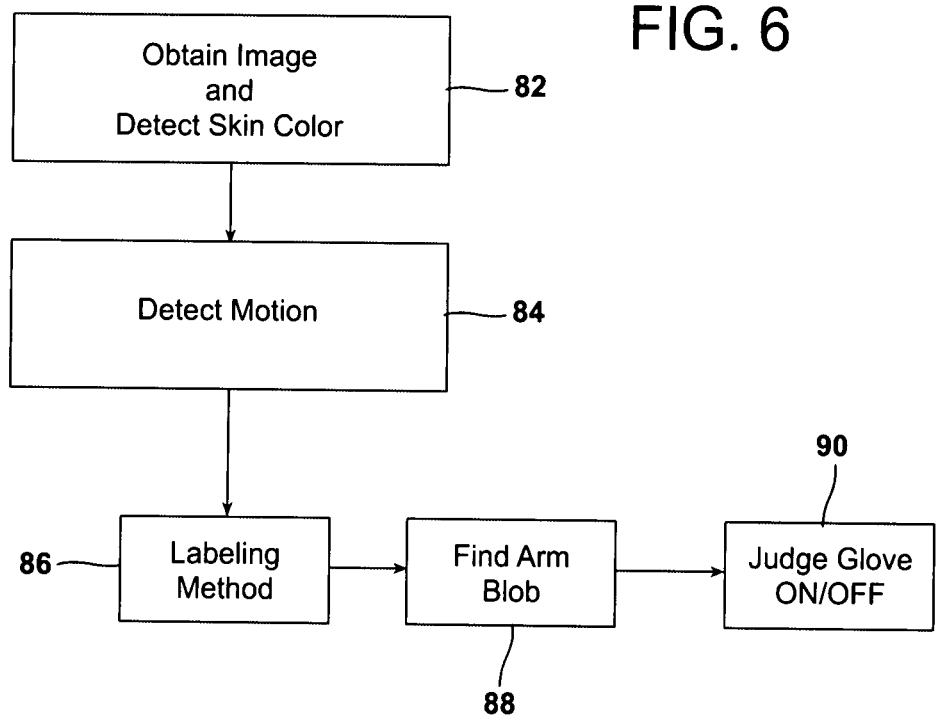
FIG. 6 is a schematic diagram illustrating an automated machine vision process and system for monitoring and controlling contamination in a production area through the monitoring and control of the wearing of one or more gloves by one or more individuals in the production area.

FIG. 6 is a schematic of an automated process for detecting gloves on hands (or other hand associated CCE) using a computer algorithm further coupled to hardware. The algorithm is carried out by obtaining an image and detecting skin color (82) in the image, followed by detecting motion (84) of the image, followed by a labeling method (86), followed by finding an arm blob (88), followed by judging whether a glove is "on" or "off" the arm (90).

Skin color detection can be assessed in accordance with the methodology disclosed above for the tracking of faces.

Motion can be detected using a motion subtraction method. Motion exists if:

$$\Sigma_{(region\ of\ interest)} \{|I_n(x,y) - I_{n-T}(x,y)|\} > threshold$$

Most web cameras have this function. Motion detector devices can also be used.

The labeling method can be carried out by obtaining a blob from a binary image. The arm blob can be found by finding the closest blob to a pre-determined object.

Figure 7:
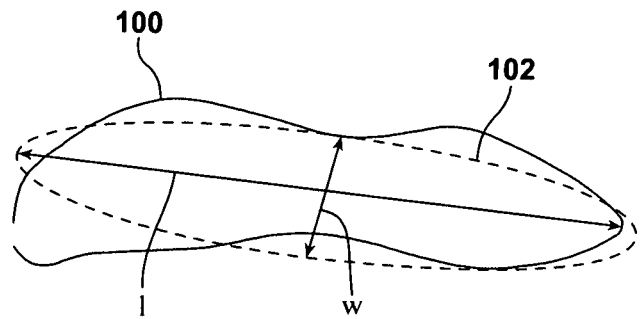
FIG. 7 is a schematic illustrating a manner of assessing an arm blob to determine whether CCE is present.
Figure 8:
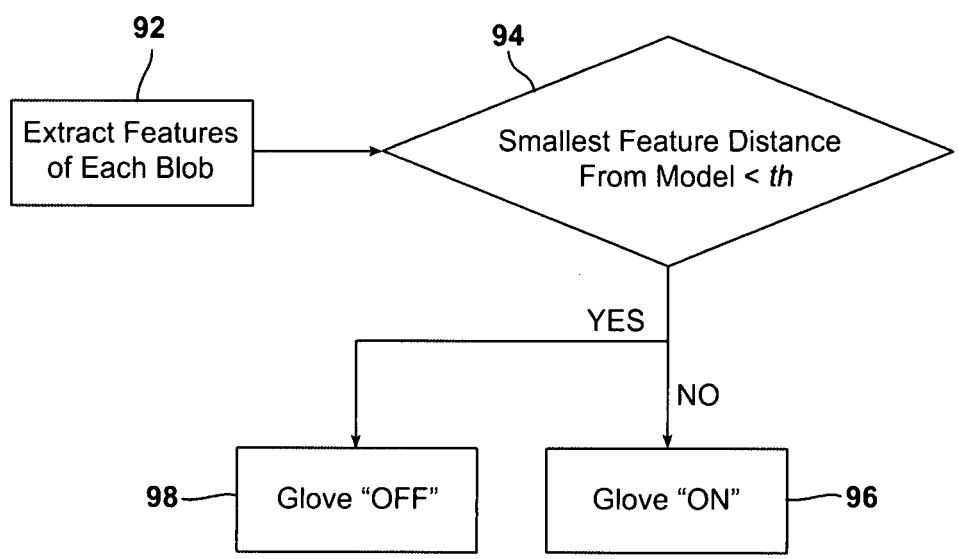
FIG. 8 is a schematic illustrating the process of judging whether CCE is on or off of an arm.

Features include the size and the aspect ratio (i.e., ratio of horizontal to vertical size), with the blob being approximated as an ellipse, with the aspect ratio being the ratio of the long radius to the short radius. FIG. 7 illustrates arm blob 100 with a dotted line illustrating ellipse 102 that approximates the size of arm blob 100. Ellipse 102 has length "l", width "w", and an aspect ratio of l:w or l/w FIG. 8 is a schematic illustrating the process of judging whether the glove is on or off the arm. Features are extracted from each blob (92), following which the data is processed to determine whether the smallest feature distance from a model is less than a threshold value th (94), If the smallest feature distance is not less than the threshold value, the glove is determined to be "on" (96). If the smallest feature distance is determined to be less than the threshold value, the glove is determined to be "off" (98).

The extraction of features from each blob is carried out by determining the long radius of the fitted ellipse, determining the short radius of fitted ellipse, determining the distance from a model contour by (a) finding the closest point in the object contour from model contour, and (b) summing the distances.

The smallest feature distance (greatest similarity value) is determined by assessing the blob feature as:

$$x=(1,x_1,x_2,x_3,\ldots)^T,$$

assessing the model feature as:

$$y=(1,y_1,y_2,y_3,\ldots)^T,$$

and assessing the feature distance as:

$$d=(x-y)^T M(x-y).$$

Since there can be more than one model, find minimum of d. M is matrix often used as inverse covariance.

Judging whether the smallest feature distance is less than the threshold value can be carried out as follows:

if $(x_1 > th_1)$length of blob>threshold and $(x_2 < th_2)$width of blob<threshold $(x_3 > th_3)$skin pixels>threshold, then the glove is determined to be "OFF". Otherwise, the glove is determined to be "ON".

Tracking a hand blob and maintaining stable properties of the hand-associated CCE so that these properties can be used to make consistent determinations of whether the glove is "on" or "off", are carried out as follows:

Sequence breaks are found by supposing $t_0, t_1, t_2, \ldots$ are instances when a motion is detected. If $(t_{n+1}-t_n)$>threshold, then there is a sequence break between $t_{n+1}$ and $t_n$. Otherwise, $t_{n+1}$ and $t_n$ are in the same sequence. The results are grouped by sequence. Focusing on each sequence, count the number of glove OFF images (=$N_{OFF}$). If $N_{OFF}$>threshold, then output warning with image. Find a warning image in the sequence, i.e., an image used in activating a CC device, by identifying the most representative hand-like blob image, and by considering the images at the midpoint of the continuous OFF images.

EXAMPLES

As an example, a cutting board is located at a sandwich making station. A sandwich-maker is located at the cutting board and is monitored by a video camera such as a Trendnet® TV IP 110 internet camera server network camera. The camera sends a visual data wirelessly via a router (e.g., NETGEAR®—RangeMax 802.11g Wireless Router, model WPN824, available from Best Buy, P.O. Box 9312, Minneapolis, Minn. 55440) to a computer (e.g., eMachines—Netbook with Intel® Atom™ Processor, Model: EM250-1915, also available from Best Buy). The computer processes the data in a near real time manner to determine if the sandwich-maker is complying with proper contamination-prevention protocol such as wearing gloves and a cap. The output signal from the computer controls light emitting diodes embedded within the cutting board. The cutting board, made with food-grade polyethylene, may have light emitting diodes embedded in a corner, overlaid with a translucent printing identifying a hat, gloves, or other contamination-related identifiers. Additional signal-receiving circuitry may be embedded in the cutting board so that a signal from the transmitter at the control computer can be received, further illuminating the board in the proper location to help warn the sandwich maker of any safety requirement being violated.

Figure 9:
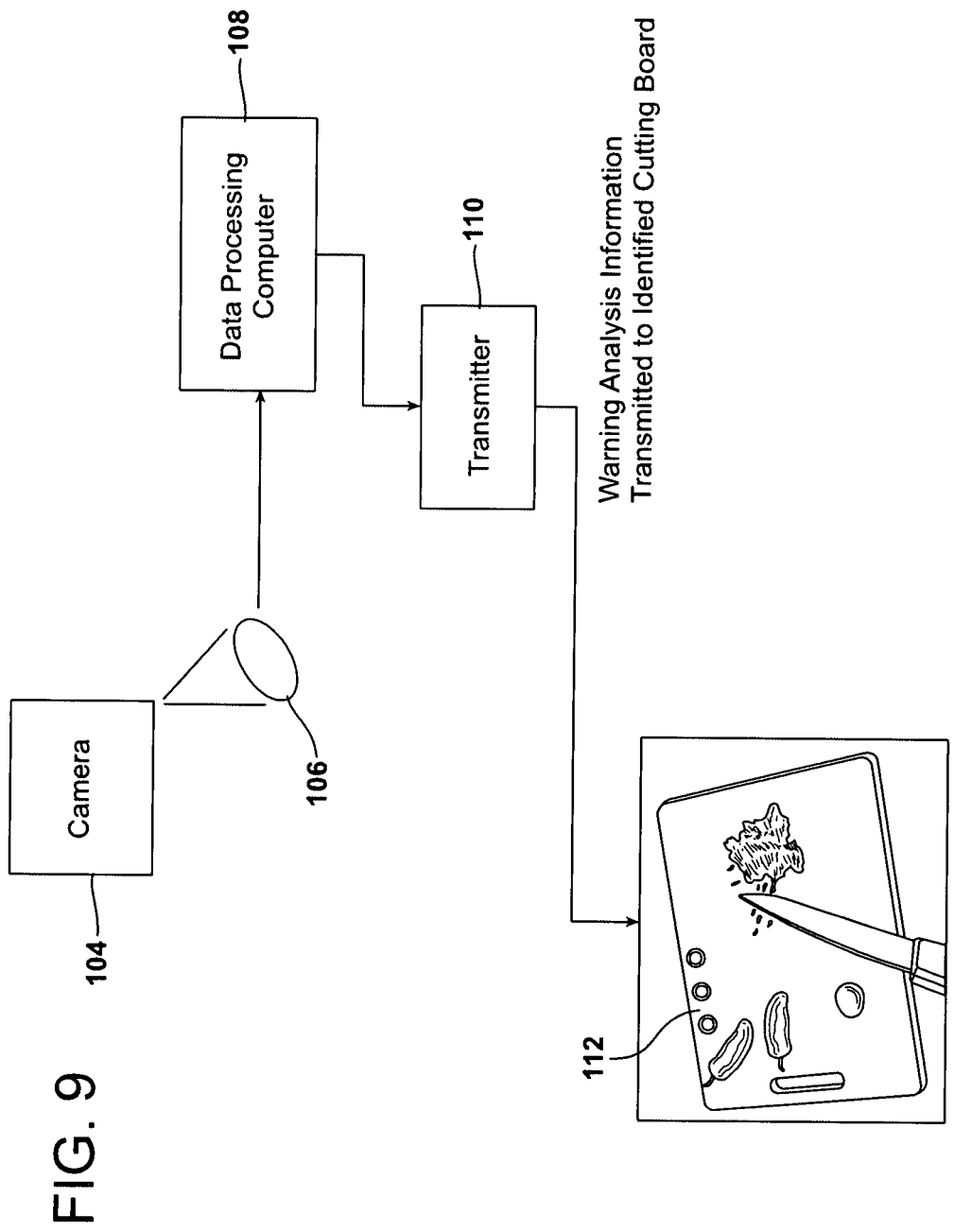
FIG. 9 is a schematic illustrating an automated machine vision process and system for monitoring and controlling contamination in the preparation of a sandwich.

FIG. 9 is a schematic diagram illustrating an automated machine vision process and system for monitoring and controlling contamination in the sandwich-making example above. Camera 104 captures image data 106 that is processed by data processing computer 108. If data processing computer 108 detects a protocol violation, it sends that transmitter 110 then sends to cutting board 112.

In a similar manner, other items such as hats, gloves, shoes, utensils, tools, furniture, conveyors can be fitted with warning circuitry and light emitting diodes including colored lights to further help in training. For example, a green, yellow, and red light may indicate the number of violations identified in a period of time. Warning lights may be positioned independently in locations easily viewed by workers. In some cases, the lights may be accompanied with acoustics including warning messages. A sign may have back-lit lettering such as "Did you wash your hands?" or "Sanitize your shoes!" These signs may be activated by the computer vision system as described above when a fault is detected.

Similarly, signs may be located at a blender to identify if a batch of food has been contaminated by a lost glove and a relay may be activated to shut the blender down. The occurrence of such an event, left undetected, can contaminate a large number of food products. A machine vision safety system can be used to identify the error when it occurs, as well as identifying the contaminated products prior to distribution.

For example, if a sandwich maker is not wearing gloves, or if the gloves are not properly positioned, the sandwich-maker can be identified when he touches a sandwich or edible product, and the product may be tracked through to its wrapping or packaging state. Prior to delivery to the customer, the package may be sent through a printing, labeling, or laser marking station (e.g., LP-V10 Series Laser Markers FAYb manufactured by Panasonic) and the wrapping or package marked or labeled with words or symbols to convey "contaminated food" or "do not use". In some cases, the sandwich or food may be placed on a conveyor for transit and an electromechanical or pneumatic system may divert the contaminated product to a disposal station or a cleaning station. In contrast, uncontaminated food may be placed in a "safe zone" or labeled "handled safely". Hyperspectral imaging devices may be utilized as primary or secondary data capturing devices, in combination with appropriate data processing of the data therefrom.

Figure 10:
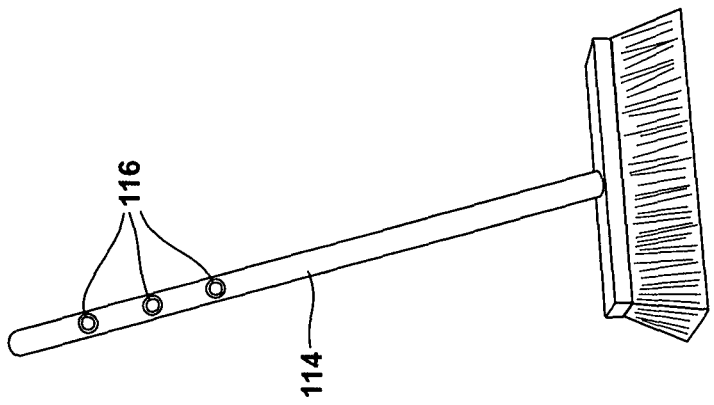
FIG. 10 is a schematic illustrating a broom having warning lights that can be activated upon monitoring whether sanitary gloves are being contaminated while the broom is in use.

The handling of non-food preparation items such as money, brooms, or door knobs can also be identified by creating monitored zones in which a worker should remove his gloves. FIG. 10 illustrates a broom 114 having warning lights 116 that can be activated upon monitoring whether gloves are being worn while the broom is in use. By tracking an individual as he enters a zone where he should not be wearing gloves, such as using broom 114, warning lights 116 positioned on the handle of broom 114 notify the user of this unsafe practice, as well as to dispose of gloves contaminated through the unauthorized contact. In addition, the power to a cash register may be terminated via a relay (e.g., High-Amp & Medium-Amp Relays, available from McMaster-Carr Supply Company, P.O. Box 54960, Los Angeles, Calif. 90054-0960), or, in the case of a setting in which a machine (e.g., an automatic power slicer for slicing deli meat) is to be used in combination with sanitary gloves, the power to the machine may be shut off if the individual is not wearing gloves while loading and unloading food from the machine.

Figure 11:
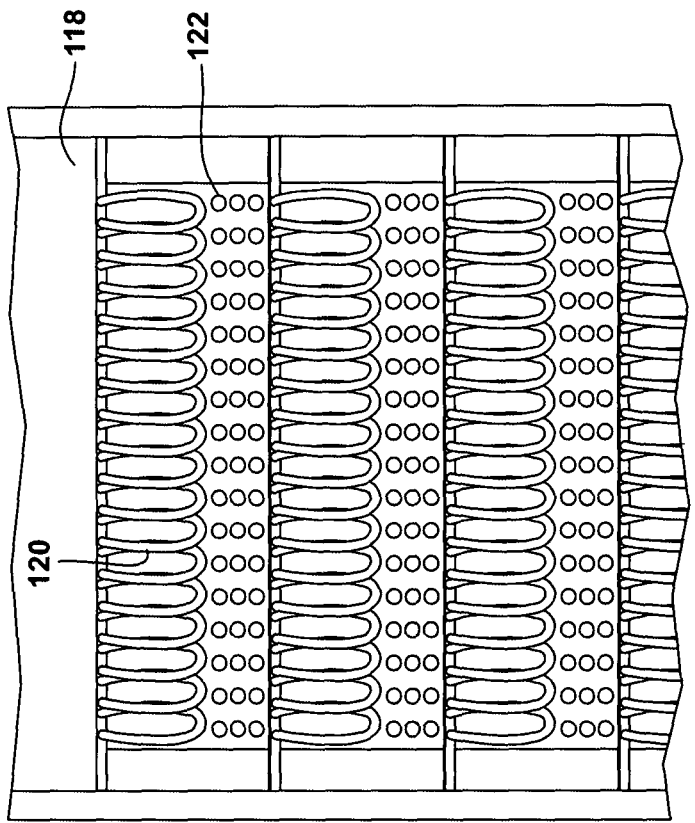
FIG. 11 illustrates a rack holding sausage, with warning lights associated with each hanging sausage.

FIG. 11 illustrates a rack 118 holding sausage 120. Above each hook light emitting diode 122 is affixed, with each hook being connected to a sensor (not illustrated, but, e.g., Compact Digital Hanging Scale Legal-for-Trade 6 lb/2.7 Kg capacity, item number 3952T41, from McMaster-Carr Supply Company, P.O. Box 54960, Los Angeles, Calif. 90054-0960) that detects when a sausage is added or loaded to a cart. Consider a sausage maker who has forgotten to wear a hair net. When the sausage-maker, identified by the algorithms as not following the safety protocol, approaches the cart, a warning status alarm is transmitted to the cart and to the hooks that have changed weight when the worker touches the sausage. The red light above each of these hooks warns that the sausage is unfit for sale.

Figure 12:
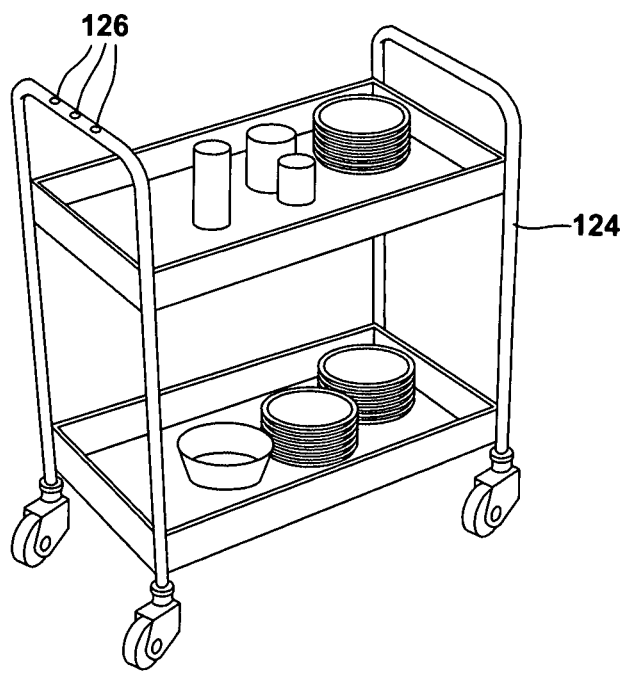
FIG. 12 illustrates a cart holding various items intended to remain uncontaminated, the cart having warning lights thereon.

In some cases a warning light may be installed within a mechanical fixture used to hold food which may be activated to identify that the food hanging, contained, attached, or associated to the fixture has been handled by an operator that was not practicing safe food handling protocol such as wearing gloves. The contamination monitoring and control system can be designed to be capable of detecting whether a worker has coughed on food or sanitary items while the food is on a cart, as illustrated in FIG. 12, in which cart 124, holding various items intended to remain uncontaminated, has warning lights 126 thereon. Warning lights 126 are to be activated in the event of contamination of the items on cart 124, such as by unsanitary handling without gloves, sneezing, coughing, etc. Such a system could, for example, help to prevent to prevent the spread of germs to patients in a health care facility such as a hospital, outpatient center, doctor's office, or retirement home.

What is claimed is:

1. An automated process for monitoring and controlling contamination in a production area, comprising:
   (A) capturing image data from the production area;
   (B) processing the image data to determine:
      (i) whether an individual is present within the production area in which the individual is to be wearing an article of contamination control equipment; and
      (ii) whether the article of contamination control equipment is present and properly positioned on the individual while the individual is working in the production area; and
   (C) activating a contamination control device if the article of contamination control equipment is not present and properly positioned on the individual while the individual is working in the production area; and
   wherein:
      the image data is captured over a time period; and
      the processing of the image data is carried out to find an image of at least a portion of an individual in motion, using a stabilization algorithm to determine whether the image data satisfies a threshold image value for a threshold time period, with the threshold image value being a pre-determined minimum image value correlating with an absence of the contamination control equipment properly positioned on the individual, and the threshold time period being a pre-determined minimum time period that the threshold image value is satisfied, with the contamination control device being activated if the threshold image value is satisfied for the threshold time period.

2. The automated process according to claim 1, wherein the activating of the contamination control device comprises activating at least one member selected from group consisting of:
   (i) a means for contamination control;
   (ii) an alarm to notify the individual that the at least one article of contamination control equipment is not present or is not properly positioned;
   (iii) the generation of a report that the article of contamination control equipment was not present while the individual was present in the production area, or was not properly positioned while the individual was present in the production area.

3. The automated process according to claim 2, wherein the report includes an image of the individual in the production area while the threshold image value is satisfied for the threshold time period, and a notation of a time at which the image was captured.

4. The automated process according to claim 1, wherein the contamination control equipment comprises at least one member selected from the group consisting of a glove, a face mask, a suit, a gown, and a hair net.

5. The automated process according to claim 1, wherein the image data is captured by scanning at least a portion of the production area with a camera.

6. The automated process according to claim 1, wherein at least one member selected from the production area, the individual and the article of personal protective equipment has an RFID tag thereon.

7. The automated process according to claim 1, wherein the activating of the contamination control device comprises activating at least one member selected from group consisting of:
   (i) be contamination control;
   (ii) an alarm to notify the individual that the at least one article of contamination control equipment is not present or is not properly positioned;
   (iii) the generation of a report that the article of contamination control equipment was not present while the individual was present in the production area, or was not properly positioned while the individual was present in the production area.

8. The automated process according to claim 7, wherein the means for contamination control comprises at least one member selected from the group consisting of: (i) cutting off power to at least one machine in the production area, and (ii) interjecting physical restraint or barrier between the individual and the machine in the production area.

9. The automated process according to claim 7, wherein activating the contamination control device comprises setting off the alarm, and the alarm comprises at least one member selected from the group consisting of an audible alarm, a visual alarm, and a vibratory alarm.

10. The automated process according to claim 7, further comprising the transmission of the report, with the transmission of the report comprising at least one member selected, from the group consisting of transmission of an electronic, report and transmission of a hard copy report.

11. An automated system for monitoring and controlling contamination in a production area, the system comprising:
(A) as computer:
(B) an imaging sensor in communication with the computer, the imaging sensor configured and arranged to capture image data of at least a portion of the production area;
(C) computer-readable program code disposed on the computer, the computer-readable program code comprising:
(i) a first executable portion for processing image data and creating an image of the production area,
(ii) a second executable portion for processing image data to find an image of an individual or a portion of an individual in the production area,
(iii) a third executable portion for processing image data and determining whether an article of contamination control equipment is present in association with the image of the individual or the image of the portion of the individual,
(iv) a fourth executable portion for processing image data and determining if the article of contamination control equipment is properly positioned on the individual while the individual is in the production area,
(v) a sixth executable portion for activating a contamination control device if the article of contamination control equipment is not present and properly positioned on the individual while the individual is present in the production area; and
(vi) a seventh executable portion comprising a stabilization algorithm to determine whether the image data satisfies a threshold image value for a threshold time period, with the threshold image value being a pre-determined minimum image value correlating an absence of the contamination control equipment properly positioned on the individual, and the threshold time period being a pre-determined minimum time period that the threshold image value is satisfied.

12. The automated system according to claim 11, wherein the imaging sensor is a first imaging sensor and the system further comprises a second imaging sensor in communication with the computer, with the computer-readable program code disposed on the computer being provided with executable first, second, third, and fourth executable portions for creating and processing image data of at least a portion of the production area from the second imaging sensor, with the creating and processing of the image data from the second imaging sensor being carried out in a manner corresponding with the executable portions for capturing and processing image data from the first imaging sensor.

13. The automated system according to claim 11, wherein the imaging sensor is a scanning imaging sensor configured and arranged to scan a production area.

14. The automated system according to claim 11, further comprising a data entry device that is in communication with the computer.

15. The automated system according to claim 11, further comprising a primer that is in communication with the computer and is capable of printing a report of a determination of whether contamination control equipment is properly positioned on the individual in the production area.

* * * * *